(12) United States Patent
Maglaque et al.

(10) Patent No.: US 8,086,533 B1
(45) Date of Patent: Dec. 27, 2011

(54) SYSTEM, METHOD, AND COMPUTER PROGRAM PRODUCT FOR PAYMENT AUTHORIZATION BASED ON A VARIABLE PAYMENT AUTHORIZATION SCORE

(75) Inventors: Chad Maglaque, Seattle, WA (US); Joe Lauer, Seattle, WA (US)

(73) Assignee: Amdocs Development Limited-Guernsey Branch, St. Peter Port, Guernsey (GB)

( * ) Notice: Subject to any disclaimer, the term of this patent is extended or adjusted under 35 U.S.C. 154(b) by 0 days.

(21) Appl. No.: 11/761,926

(22) Filed: Jun. 12, 2007

Related U.S. Application Data

(60) Provisional application No. 60/896,741, filed on Mar. 23, 2007.

(51) Int. Cl.
*G06Q 40/00* (2006.01)
(52) U.S. Cl. .......................................................... 705/44
(58) Field of Classification Search ....................... 705/44
See application file for complete search history.

(56) References Cited

U.S. PATENT DOCUMENTS

| | | | | |
|---|---|---|---|---|
| 7,386,506 B2 * | 6/2008 | Aoki et al. | ....................... | 705/38 |
| 7,505,962 B2 * | 3/2009 | Shariff et al. | ........................ | 1/1 |
| 2006/0106738 A1 * | 5/2006 | Schleicher | ....................... | 705/401 |
| 2006/0229961 A1 | 10/2006 | Lyftogt et al. | ..................... | 705/35 |
| 2007/0000999 A1 * | 1/2007 | Kubo et al. | ..................... | 235/380 |

OTHER PUBLICATIONS

New Bill in House Would Overturn Ban and Revive Down Payment Assistance; Lisa Burden, Credit Union Times. West Palm Beach: Sep. 3, 2008. vol. 19, Iss. 35, p. 3.*
Companies can check your credit report without permission; Pemela Yip. Mc Clatchy-Tribune News Service. Washington: Mar 10, 2008.*
Cooperation Cuts Credit Card Collection Losses; Bloomer, Jack, DeBellis, Joseph. Banking Management. Rolling Meadows: Sep. 1991. vol. 67, Iss. 9, p. 53 (2 pages).*
Credit score-Wikipedia, the free encyclopedia: http://en.wikipedia.org/w/index.php?title=Credit score & printable=yes; Jul. 2, 2008.*
"Credit Score" http://www.wikipedia.org/w/index.php?title=Credit_score&printable=yes.

* cited by examiner

*Primary Examiner* — Alexander Kalinowski
*Assistant Examiner* — Hatem Ali
(74) *Attorney, Agent, or Firm* — Zilka-Kotab, PC

(57) ABSTRACT

A system, method, and computer program product are provided for generating a variable payment authorization score. In use, a payment authorization request is received. In response, a variable payment authorization score is generated. Further, the variable payment authorization score is provided for use.

14 Claims, 7 Drawing Sheets

SYSTEM, METHOD, AND COMPUTER PROGRAM PRODUCT FOR PAYMENT AUTHORIZATION BASED ON A VARIABLE PAYMENT AUTHORIZATION SCORE

This application claims the benefit of U.S. Provisional Application No. 60/896,741 filed on Mar. 23, 2007, the disclosure of which is incorporated herein by reference.

FIELD OF THE INVENTION

The present invention relates to computer-implemented frameworks, and more particularly to computer-implemented frameworks designed for carrying out a variety of application-specific tasks.

BACKGROUND

Currently, there are a large number of merchants in the commercial marketplace without direct access to payment authorization capabilities of a payment provider (e.g. credit card company, etc.). As a result, such merchants do not have a mechanism to determine whether they will be paid for the goods and/or services which they deliver. Thus, merchants can only hope that the revenue that they will eventually receive covers their day-to-day operational costs, etc.

There is thus a need for addressing these and/or other issues associated with the prior art.

SUMMARY

A system, method, and computer program product are provided for generating a variable payment authorization score. In use, a payment authorization request is received. In response, a variable payment authorization score is generated. Further, the variable payment authorization score is provided for use.

DETAILED DESCRIPTION

Figure 1:
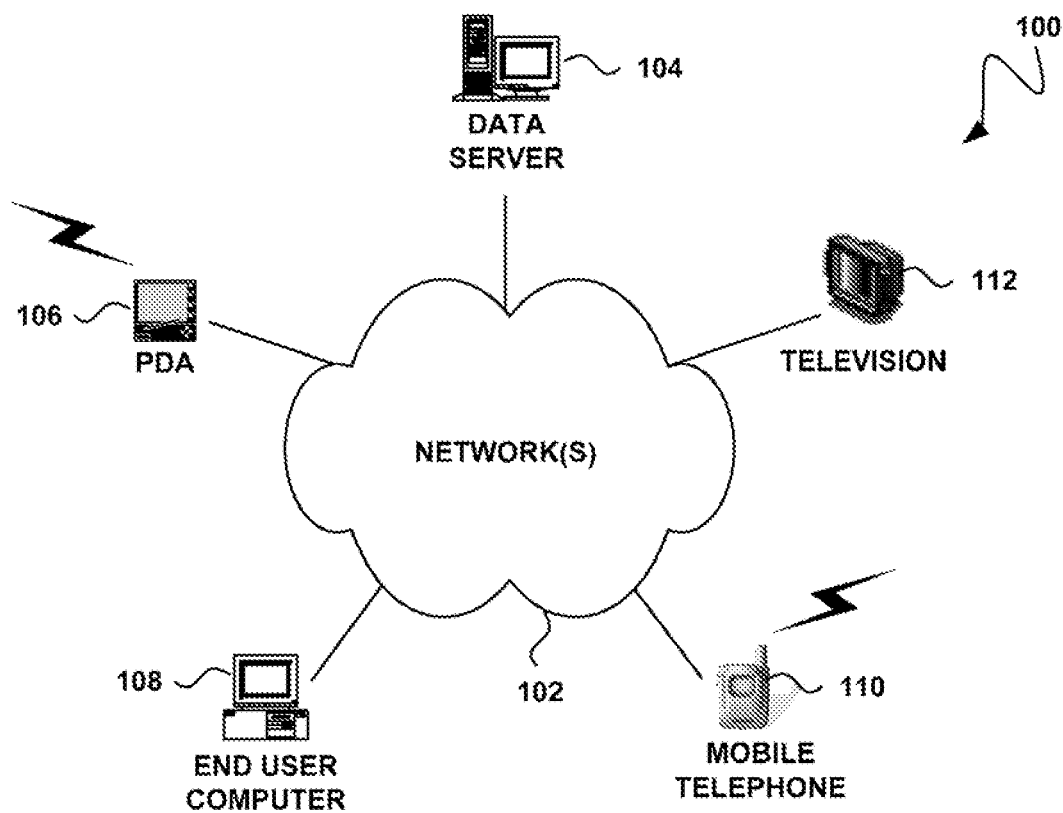
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PEA) device 108, a mobile phone device 110, a television 112, etc.

Figure 2:
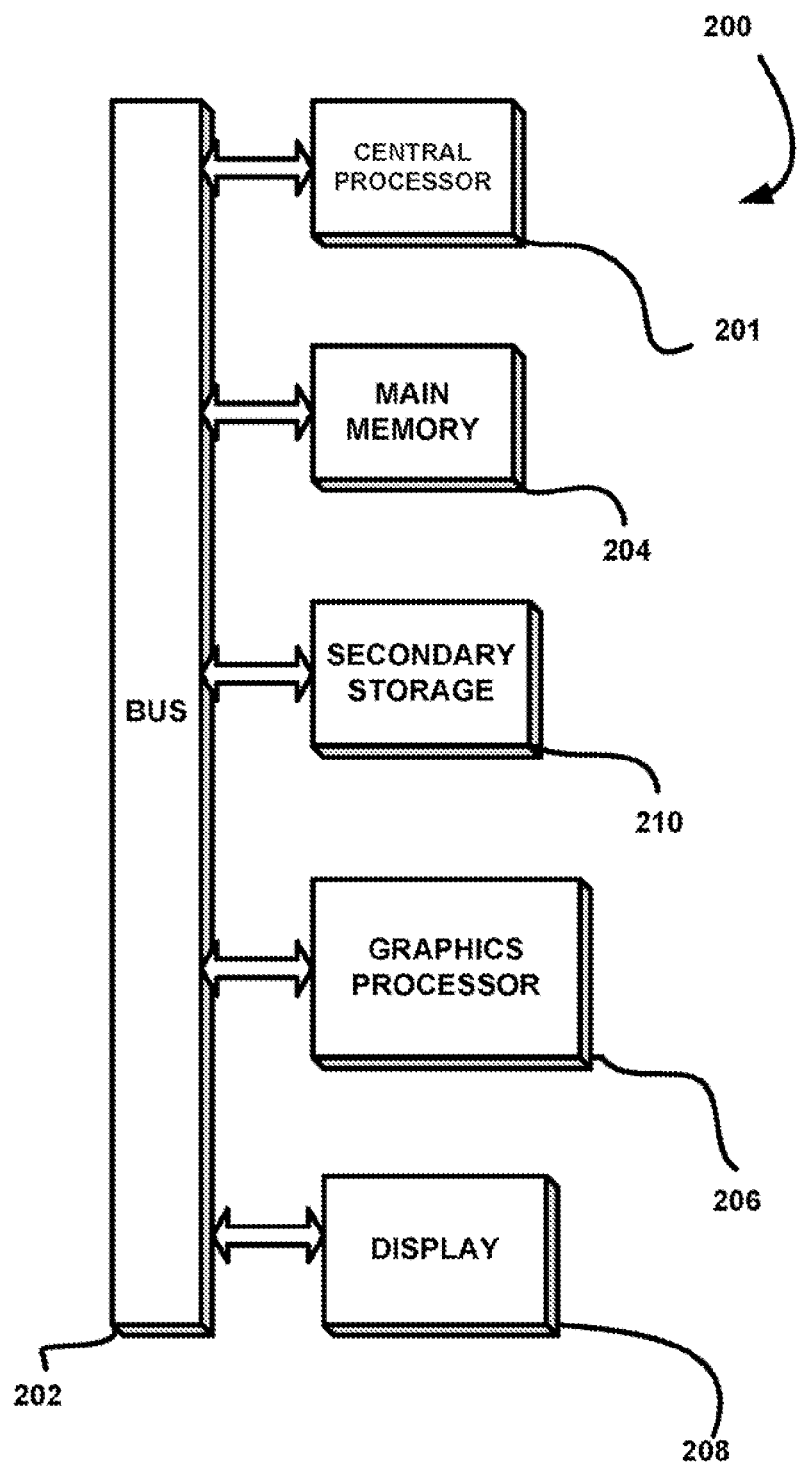
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 may also include a graphics processor 206 and a display 208. Of course, in another embodiment the system 200 may not include the graphics processor 206 and/or the display 208. For instance, the system 200 may not include the graphics processor 206 and/or the display 208 if the system 200 is being used for computational purposes.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Figure 3:
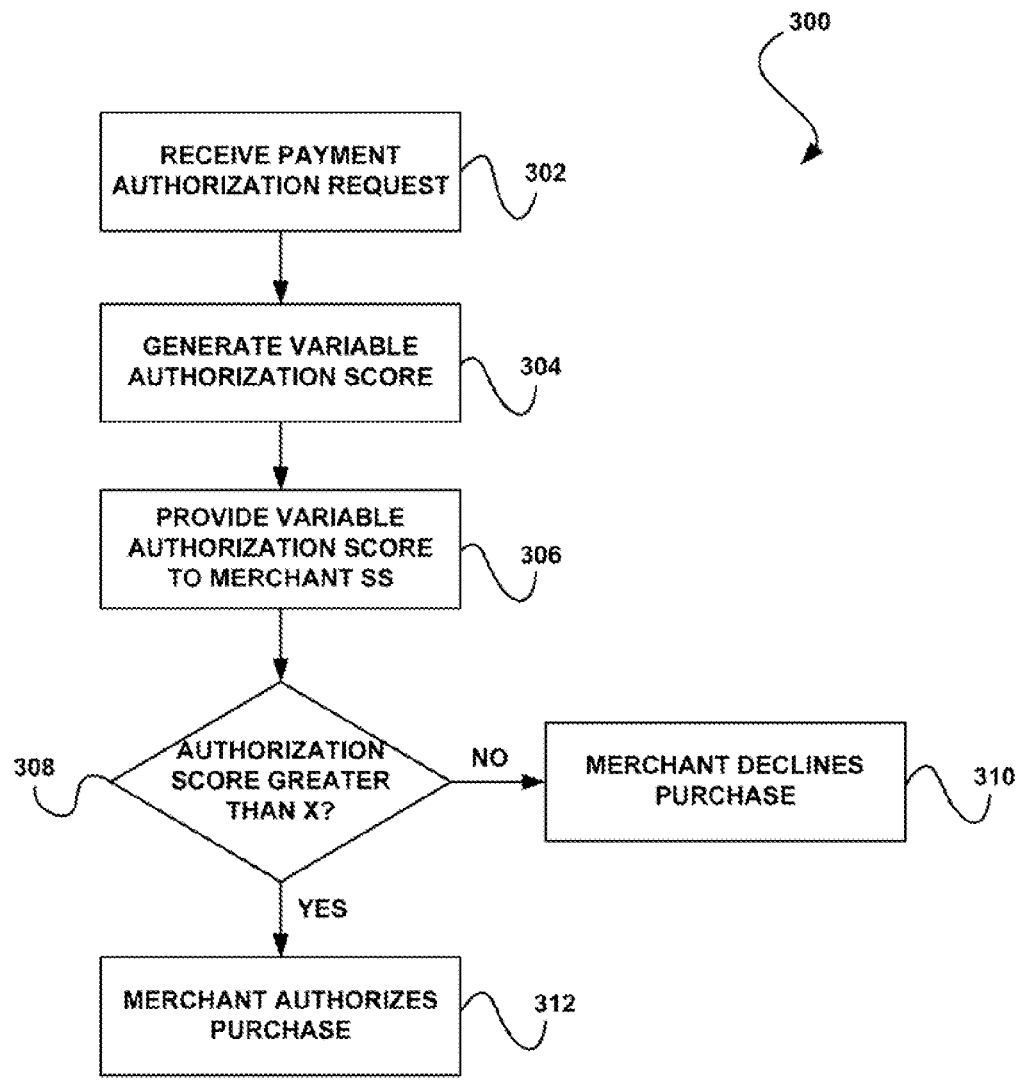
FIG. 3 illustrates a method for payment authorization using a variable authentication score, in accordance with one embodiment.

Computer programs, or computer control logic algorithms, may be stored in the main memory 204 and/or the secondary storage 210. Such computer programs, when executed, enable the system 200 to perform various functions. Memory 204, storage 210 and/or any other storage are possible examples of computer-readable media FIG. 3 shows a method 300 for payment authorization using a variable authentication score, in accordance with one embodiment. As an option, the method 300 may be implemented in the context of the details of FIGS. 1 and/or 2. Of course, however, the method 300 may be carried out in any desired environment (e.g. without a network, etc). Further, the aforementioned definitions may equally apply to the description below.

As shown in operation 302, a payment authorization request is received. As an option, such request may be received from a merchant subsystem. In the context of the present description, such payment authorization request may include anything that is capable of prompting the generation of a variable payment authorization score, as will soon become apparent.

In one embodiment, such payment authorization request may include a payment account number. In another embodiment, such payment authorization request may include an amount of an associated transaction. In still another embodiment, the payment authorization request may include any identifier that is capable of being used to obtain any information required to generate the variable payment authorization score. In other embodiments, the request may actually include such information. In still other embodiments, the amount of the associated transaction may be obtained utilizing a product identifier or other similar identifier. Similarly, the payment account number may be obtained utilizing other data. For example, the account number may be provided in an email or other form of communication. The account number may be further utilized to determine other relevant data relating to the purchase (e.g. a payment provider's information).

Additionally, in the context of the present description, the term merchant refers to any buyer and/or seller of goods and/or services. For example, in various embodiments, merchants may include, but are not limited to, buyers and/or sellers of physical goods and/or services, buyers and/or sellers of digital goods and services, including digital goods and/or services delivered to a mobile device, and/or any other entity engaged in commerce.

As shown in operations 304-306, a variable authorization score is generated and provided. In the context of the present description, the variable authorization score refers to anything that is used to determine (or identify a probability of) whether an entity will, after payment, incur a positive net revenue for delivery of goods and/or services associated with a corresponding transaction(s).

Just by way of example, in one possible embodiment, the variable authorization score may be in the form of a set of values from 0 to N (e.g. 0 to 99, 0 to 0.99, 0 to 5, etc.), such that the merchant can use the authorization score to determine a likelihood of receiving a payment on any given transaction. The merchant may then decide, based on the merchant's own internal cost of goods and/or services, for example, whether to deliver the goods and/or services, etc.

It should be noted that the variable authorization score may be generated utilizing any number of heuristics, algorithms, and/or other techniques. For example, in one embodiment, a heuristic or algorithm may be utilized to establish a probability of whether an account number is invalid or inactive. In another embodiment, a heuristic or an algorithm may be utilized to determine the probability of a payment being received based on a consumer's previous purchasing and/or refund behavior. Still yet, in another embodiment, a heuristic or algorithm may be utilized to determine a probability of a payment being received based on the consumer's level of purchasing activity.

It should be further noted that the receipt of the payment authorization request from the merchant subsystem in operation 302, the generation of the variable authorization score in operation 304, and/or the return of the variable authorization score (e.g. to the merchant subsystem) in operation 306, may be accomplished with or without any knowledge or access to a payment provider's actual billing system. Strictly as an option, such operations may even be performed utilizing an authorization score application program interface (API).

Further, as shown in operation 308, the merchant subsystem uses the variable authorization score to determine whether to accept or decline the prospective purchase based on the variable authorization score. As an option, such determination may also be based on an internal business rule of the merchant and/or a good/service provider, or an internal cost of goods and/or services, fur example.

In the context of the present description, the term good/service provider refers to any provider of goods and/or services. For example, in various embodiments, good/service providers may include, but are not limited to, providers of physical goods and/or services, providers of digital goods and services, including digital goods and/or services delivered to a mobile device, and/or any other entity engaged in providing goods and/or services.

The merchant or goods/service provider may choose any business rule and/or criteria on which to base their decision. For example, in the digital goods marketplace, the marginal cost of goods may be very low as the cost of digital goods such as binary text or images is usually no more than the overhead cost of delivering such information. Thus, a merchant may not need to ensure that payment will always be received on all goods (i.e. receive a binary accept or decline response for every transaction). Therefore, the merchant may only require that they can cover their operational costs and achieve a desired level of profit. Thus, the merchant may desire to maintain a lower threshold value (e.g. "X" equal to 1 in operation 308 based on an authorization scale from 0-4) in order to determine whether to authorize a payment.

On the other hand, where royalties are due on digital content, the cost of delivering such goods may be considerably higher. Thus, the merchant may desire that their internal business rule maintain a higher threshold value (e.g. "X" equal to 3 in operation 308 based on an authorization scale from 0-4) in order to cover their operational costs and achieve a desired level of profit.

In either case, the merchant may not necessarily need to ensure that payment will always be received on all goods delivered, but only that the merchant is likely to receive payment on enough of the goods and/or services delivered so that they are able to cover their operational costs and achieve a desired level of profit. It should be noted that operation 308 is only an example of an internal business rule and that any number of merchant defined business rules may be implemented, as mentioned above. Merchants may choose to make authorization decisions based on their own internal business rules and/or internal cost of goods, or any other relevant criteria. As further shown in operations 310 and 312, the merchant subsystem may decline or authorize a purchase based on the result of applying the variable authorization score to the internal business rule, as described above.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
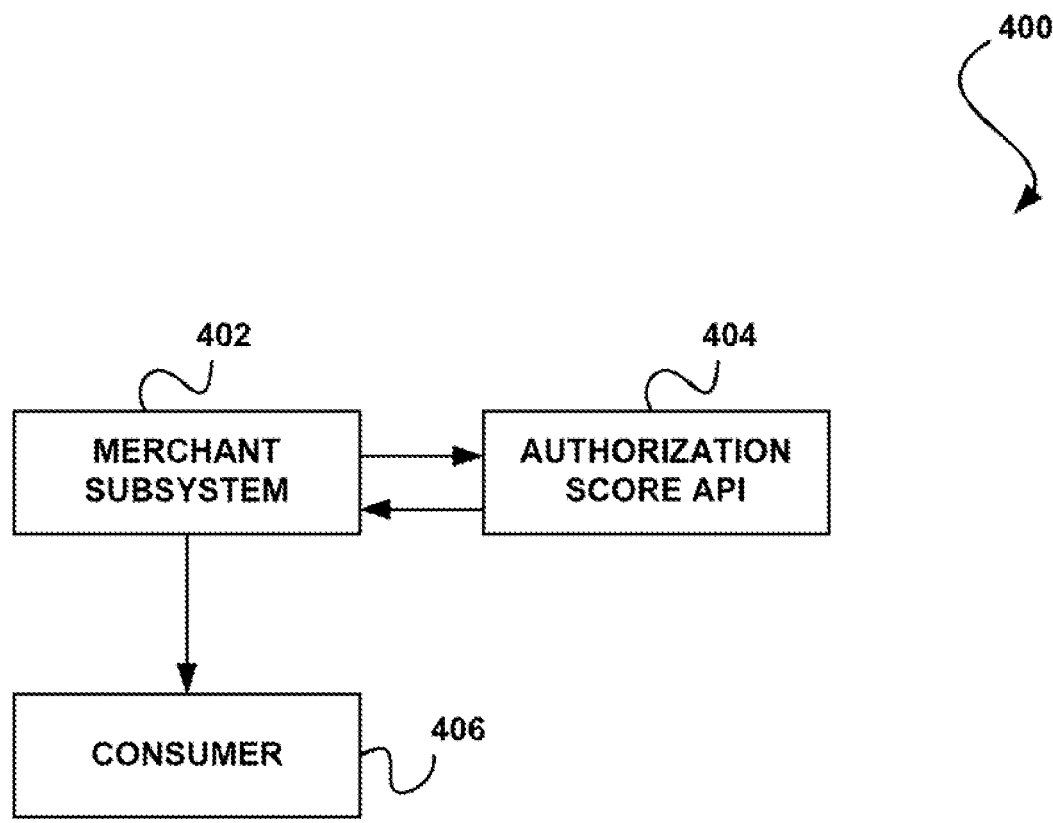
FIG. 4 illustrates a system for payment authorization using a variable authentication score, in accordance with one embodiment.

FIG. 4 shows a system 400 for payment authorization using a variable authentication score, in accordance with one embodiment. As an option, the system 400 may be used to carry out the method 300 of FIG. 3. Of course, however, the system 400 may be used in any desired environment. Further, the aforementioned definitions may equally apply to the description below.

As shown in the system 400, a merchant subsystem 402 communicates with an authorization score API 404 by sending a request for payment authorization to the authorization score API 404. The request for payment authorization is received by the authorization score API 404, and a variable authorization score is generated.

The variable authorization score is then transmitted to the merchant subsystem 402. The merchant subsystem 402 utilizes an internal business rule to determine, whether to authorize a purchase. Further, the merchant subsystem communicates the decision to a consumer 406.

In one embodiment, the merchant subsystem 402 may send the internal business rule (e.g. a threshold) to the API 404. In this case, the API 404 may determine whether the variable authorization score is acceptable based on the threshold and, in turn, send the merchant subsystem 402 a result of the determination. For example, if the variable authorization score is such that it meets the threshold, the API 404 may then send the merchant subsystem 402 a binary value (e.g. 1 or 0) indicating that the authentication has passed. Similarly, if the variable authorization score is such that it does not meet the threshold, the API 404 may send the merchant subsystem 402 a binary value (e.g. 1 or 0) indicating that the authentication has failed In another embodiment, the merchant subsystem 402 may set a plurality of flags relating to a plurality of internal business rules to indicate which rules to apply when making the authentication determination. For example, the plurality of internal business rules may be available to the API 404, thus the merchant subsystem 402 may communicate to the API 404 which of the plurality of internal business rules to apply when making the authentication determination.

In such case the merchant or the API 404 may set any of the plurality of flags (e.g. an on/off flag) relating to the internal business rules to a desired value. The API 404 may then determine whether the purchase is authorized based on the selected rules and, in turn, notify the merchant subsystem 402 by sending the merchant subsystem 402 a binary value (e.g. 1 or 0) indicating that the purchase should be authorized (i.e. passed or failed the internal business rules that were set to "on").

It should be noted that, although the merchant subsystem 402 and the authorization score API 404 are shown separately in the present embodiment, other configurations are contemplated. In other embodiments, the authorization score API 404 may be part of the merchant subsystem 402, for example.

It should also be noted that the communication between the merchant subsystem 402 and the authorization score API 404 may be implemented in a variety of ways including, but not limited to the architecture of FIGS. 1 and/or 2.

Figure 5:
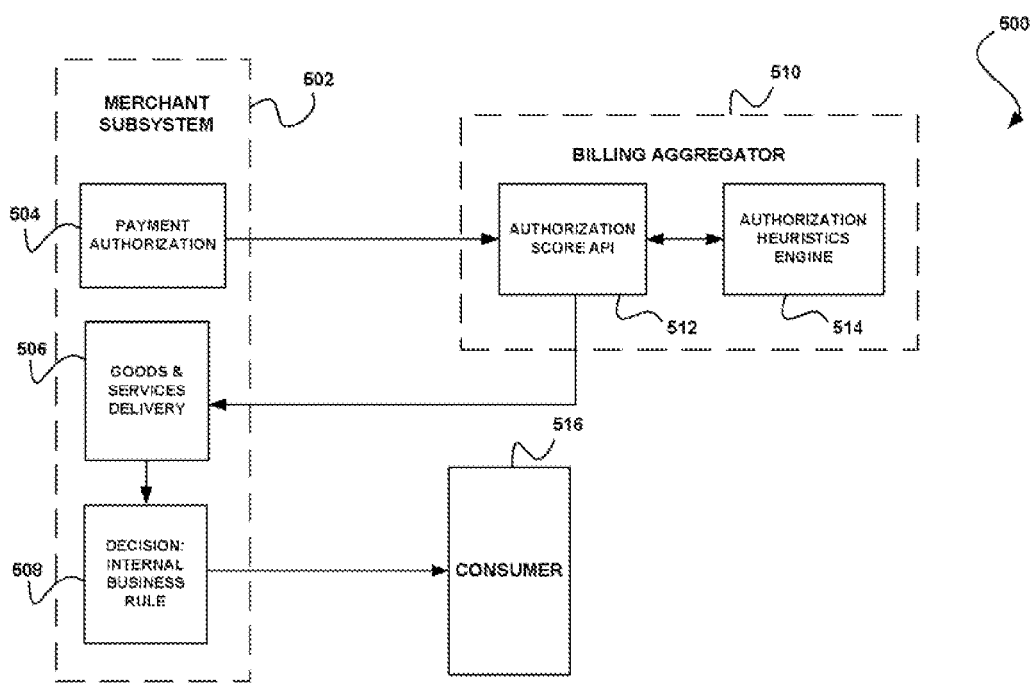
FIG. 5 illustrates a system for payment authorization using a variable authentication score, in accordance with another embodiment.

FIG. 5 shows a system 500 for payment authorization using a variable authentication score, in accordance with another embodiment. As an option, the system 500 may represent one possible implementation of the embodiment of FIG. 4. Of course, however, the system 500 may be used in any desired environment. Further, the aforementioned definitions may equally apply to the description below.

In the system 500, a merchant subsystem 502 communicates with an authorization score API 512 by sending a request for payment authorization from a payment authorization module 504. The request for payment authorization is received by the authorization score API 512, and a variable authorization score is generated in an authorization heuristics engine 514, which are both part of a billing aggregator 510, for example.

As shown, the authorization score API 512 and the authorization heuristics engine 514 may be part of the billing aggregator 510, in one embodiment. However, it should be noted that the billing aggregator 510 may be any combination or consolidation of the same. For example, in one embodiment, the billing aggregator 510 may define one module that encompasses both the authorization score API 512 and the authorization heuristics engine 514 or functionality of the same. In addition, the billing aggregator 510 may include a payments and settlements module (e.g. see billing aggregator 704 of FIG. 7) for the purpose of receiving and storing updated payment and settlement information from a payment provider (e.g. a credit card company).

As further shown in FIG. 5, the variable authorization score is then transmitted to a goods and services delivery module 506 of the merchant subsystem 502, for example. A decision module 508 then utilizes an internal business rule to determine whether to authorize a purchase based on the variable authorization score. The decision is then relayed to a customer 516.

It should be noted that the modules of the merchant subsystem 502 in FIG. 5 are shown separately for illustrative purposes only and may be combined in other embodiments.

The merchant subsystem 502 is generally shown to illustrate one potential communication platform between the authorization score API 512 and the merchant subsystem 502. In other embodiments, the merchant subsystem 502 may be treated as a single module, as in FIG. 4.

In another embodiment, the billing aggregator 510 may be part of the merchant subsystem 502. Similarly, the authorization score API 512 and the authorization heuristics engine 514 may be combined into one module, in other embodiments.

It should further be noted that the communication between the merchant subsystem 502 and the authorization score API 512 may be implemented in a variety of ways including, but not limited to utilizing the network and/or architecture set forth in FIGS. 1 and 2, respectively. For example, in one embodiment, the merchant subsystem 502 may be any type of mobile device (e.g. a mobile phone, PDA, etc.). In such embodiment, the merchant may be any user of such mobile device.

Similarly, the consumer 516 may represent any person/entity or associated device to which the merchant subsystem 502 may relay the decision based on the internal business rule. For example, in one embodiment, the consumer 516 may have a network-based device illustrated in FIG. 1 (e.g. a mobile phone, PDA, or computer). In such embodiment, the authorization decision may be relayed to such device of the consumer 516.

Of course, the consumer 516 may be any individual or entity interfacing indirectly or directly (e.g. in person) with the merchant or the merchant subsystem 502. Likewise, the merchant may be any individual or entity interfacing indirectly or directly with the authorization score API 512 on a local interface or over a network, as depicted in FIG. 1.

Figure 6:
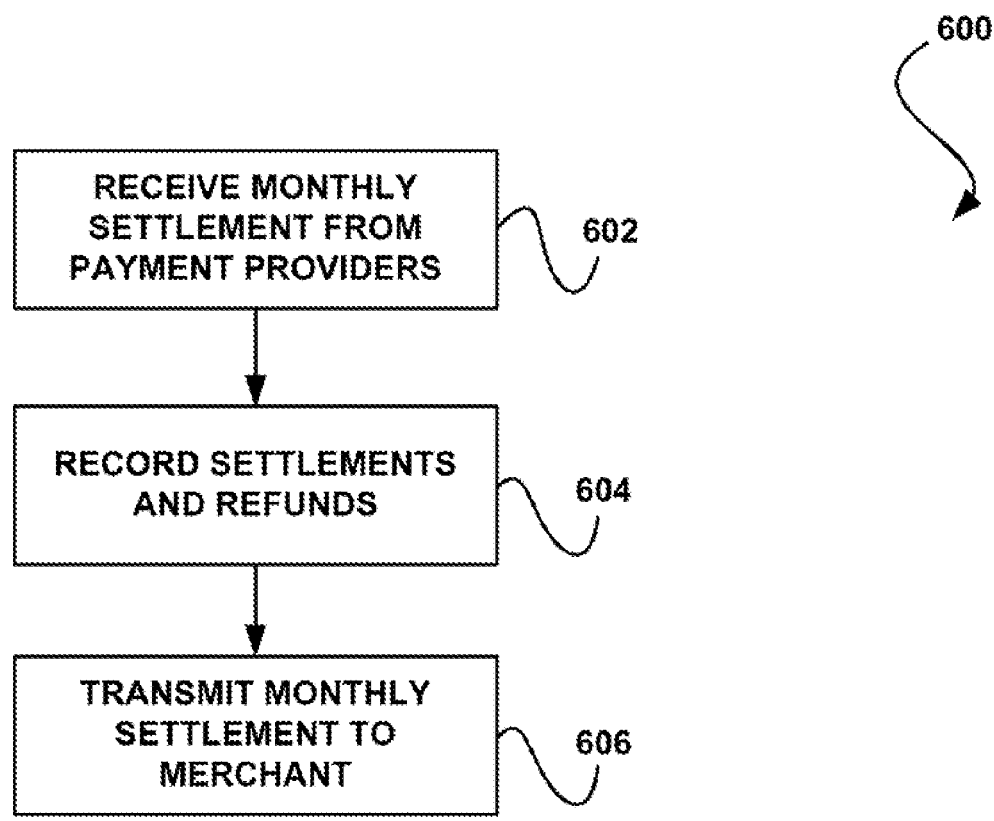
FIG. 6 illustrates a method for updating payment and settlement information, in accordance with one embodiment.

FIG. 6 shows a method 600 for updating payment and settlement information, in accordance with one embodiment. As an option, the method 600 may be implemented in the context of the details of FIGS. 1-5. Of course, however, the method 600 may be carried out in any desired environment. Further, the aforementioned definitions may equally apply to the description below.

As shown in operation 602, a billing aggregator (e.g. the billing aggregator 510 of FIG. 5) receives settlement and/or refund information from a payment provider. In the context of the present description, payment provider refers to any entity providing general payment information. For example, in various embodiments, payment providers may include, but are not limited to, banks, credit card companies or issuers, cable providers, telephone network operators, and/or any other entity that meets the above definition.

As shown in operation 604, the billing aggregator records the settlement and/or refund information. Such information may be used to update one or more databases containing settlement and/or refund information. Furthermore, information received from different service providers may be consolidated as source of information. Such information may also be utilized to update algorithms or heuristics used for generating the variable payment authorization score.

Additionally, in operation 606, the settlement and/or refund information is transmitted to the merchant subsystem. It should be noted that, in the present embodiment, the billing aggregator and the merchant subsystem may be separated and the transmission of information may thus be accomplished over a secure network. However, in other embodiments, the billing aggregator may be part of the merchant subsystem, and the merchant may receive settlement and/or refund information directly from the payment provider.

Furthermore, in the present embodiment, the billing aggregator encompasses the authorization score API, the authorization heuristics engine, and a payments and settlements module. However, it as mentioned above, the billing aggregator may be any combination or consolidation of the same.

Figure 7:
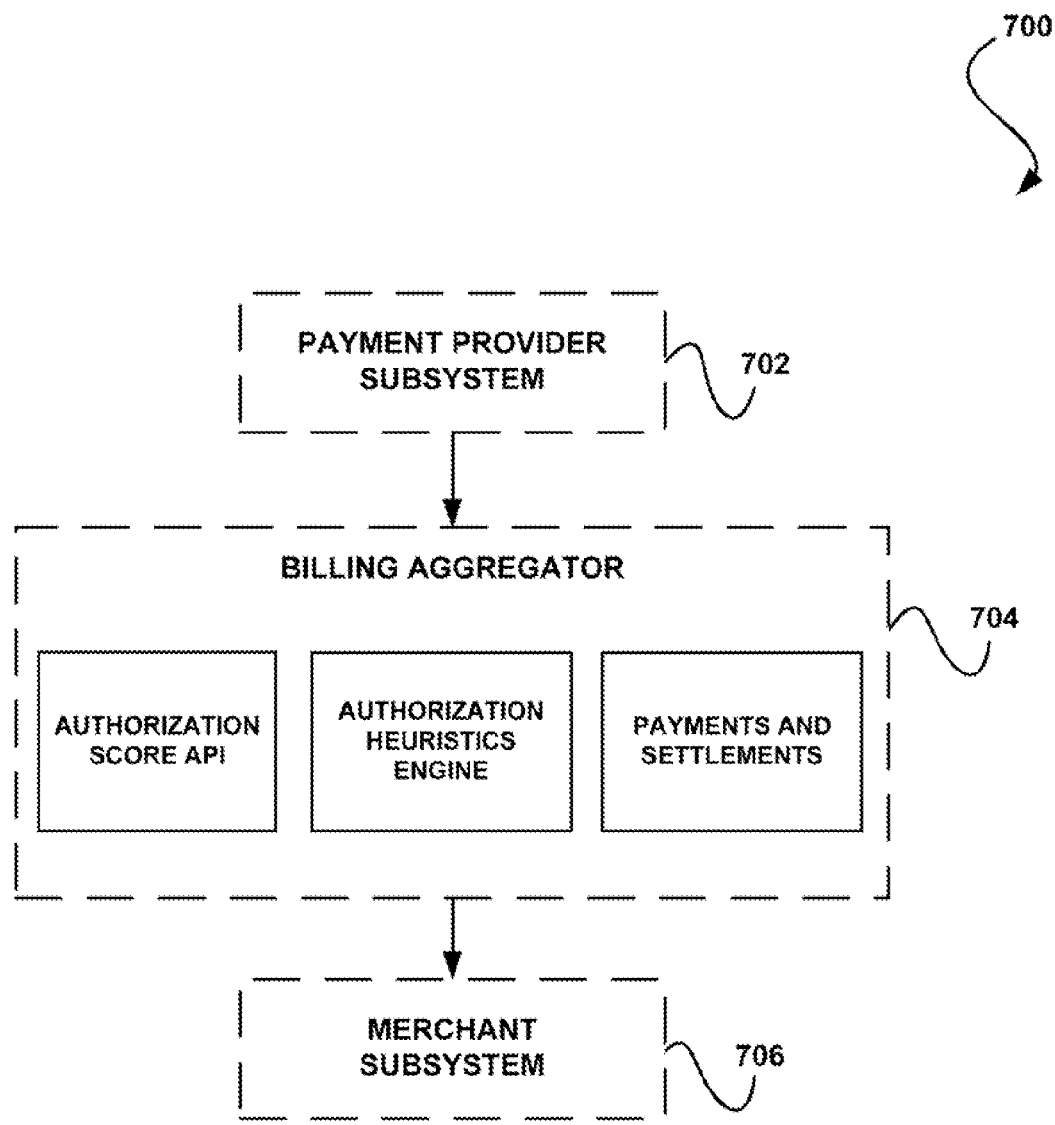
FIG. 7 illustrates a system for updating payment and settlement information, in accordance with one embodiment.

FIG. 7 shows a system 700 for updating payment and settlement information, in accordance with one embodiment. As an option, the system 700 may be implemented in the context of the details of the previous figures. Of course, however, the system 700 may be carried out in any desired environment. Further, the aforementioned definitions may equally apply to the description below.

As shown in FIG. 7, the billing aggregator 704 receives monthly settlement information from a payment provider subsystem 702. The billing aggregator 704 records the settlement information and transmits the settlement information to a merchant subsystem 706.

As mentioned above, the billing aggregator 704 is shown to encompass the authorization score API, the authorization heuristics engine, and the payments and settlements module in FIG. 7. However, it should be noted that the billing aggregator 704 may be any combination or consolidation of the same. In addition, the billing aggregator 704 may be part of the merchant subsystem 706 such that the merchant receives settlement and/or refund information directly from the payment provider. Thus, the billing aggregator 704 may only encompass the authorization score API, and the authorization heuristics engine, by way of example.

In another embodiment, the merchant subsystem 706 may receive and store settlement information directly from the payment provider subsystem 702. In turn, the billing aggregator 704 may receive the settlement information from the merchant subsystem 706.

In still another embodiment, a merchant may desire to utilize transaction information received from a previous interaction with a consumer. In such case, the merchant may communicate previous transaction information to the billing aggregator 704. The billing aggregator 704 may utilize the merchant-specific transaction information to generate a variable payment authorization score for the merchant. Such variable payment authorization score may be generated independent from or in conjunction with settlement information received from a payment provider.

In yet another embodiment, a merchant may desire a system that generates a variable payment authorization score based solely on a transaction history between the merchant and a consumer with whom the merchant has previously dealt. In such a case, the merchant subsystem 706 may communicate previous transaction history of the previous consumer to the billing aggregator 704. The billing aggregator 704 may then generate the variable payment authorization and return it to the merchant subsystem 706. The merchant subsystem 706 may thus utilize the payment authorization score to determine whether to authorize the consumer's payment based on an internal business rule.

In another embodiment, the billing aggregator 704 may utilize transaction information specific to a particular line of business in order to generate the variable payment authorization score. For example, a plurality of merchants dealing with the same services and/or goods may desire to utilize transaction information specific to their line of business for generating the variable payment authorization score. In such case, previous transaction information may be communicated to the billing aggregator 704 from the plurality of merchants. Upon receiving an authorization request from one of the plurality of merchants, the billing aggregator 704 may generate and, in turn, supply the merchant with the variable authorization score generated from transaction information specific to the particular line of business. The merchant may then utilize the payment authorization score to determine whether to authorize the consumer's payment based on an internal business rule, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a payment authorization request from a merchant;
in response to the payment authorization request, generating a variable payment authorization score via an application program interface executed by a processor that interfaces with a billing system of the merchant, the generating including:
determining, utilizing at least one of a plurality of heuristics, a probability of a payment being received based on information collected from a plurality of sources including a level of purchasing activity of a consumer and a previous purchasing or refund history of the consumer with respect to the merchant; and
generating the variable payment authorization score, including a set of values, at least in part using the determined probability of the payment being received, the variable payment authorization score indicating the determined probability of the payment being received and including information associated with a probability of whether the particular merchant will, after payment, incur a positive net revenue for delivery of at least one of goods and services associated with a corresponding transaction;
presenting to the application program interface a plurality of thresholds;
receiving, at the application program interface from a subsystem of the merchant, a subset of the plurality of thresholds via a flag set for each of the thresholds in the subset of the plurality of thresholds, a value of each of the thresholds in the subset of the plurality of thresholds based on a type of an associated at least one of goods and services and for the associated at least one of goods and services being indicative of a probability of whether the merchant will, after payment, incur a positive net revenue for delivery of the associated at least one of goods and services, wherein the value is higher for digital content for which royalties are due than for digital content for which royalties are not due;
determining by the application program interface whether the variable payment authorization score is acceptable based on one of the thresholds in the subset of the plurality of thresholds; and
sending to the subsystem of the merchant a result of the determination in a form of a binary value.

2. The method of claim 1, wherein the payment authorization request includes an account number.

3. The method of claim 1, wherein the payment authorization request includes an amount of the corresponding transaction.

4. The method of claim 1, wherein the plurality of sources include at least one payment provider.

5. The method of claim 1, wherein it is determined if the payment is acceptable based on the variable payment authorization score and at least one rule.

6. The method of claim 5, wherein the at least one rule includes the one of the thresholds in the subset of the plurality of thresholds.

7. The method of claim 6, wherein the thresholds are defined by an entity.

8. The method of claim 7, wherein the thresholds are defined based on the merchant's own internal cost of the at least one of goods and services.

9. The method of claim 6, wherein the payment is acceptable if the variable payment authorization score meets the one of the thresholds in the subset of the plurality of thresholds.

10. The method of claim 6, wherein the payment is not acceptable if the variable payment authorization score does not meet the one of the thresholds in the subset of the plurality of thresholds.

11. The method of claim 1, wherein the payment authorization score includes a numerical value.

12. The method of claim 1, wherein one of the heuristics is utilized to establish a probability of whether an account number is invalid or inactive.

13. A computer program product embodied on a non-transitory computer readable medium, comprising:
   computer code for receiving a payment authorization request from a merchant;
   computer code for, in response to the payment authorization request, generating a variable payment authorization score via an application program interface that interfaces with a billing system of the merchant, the generating including:
   determining, utilizing at least one of a plurality of heuristics, a probability of a payment being received based on information collected from a plurality of sources including a level of purchasing activity of a consumer and a previous purchasing or refund history of the consumer with respect to the merchant; and
   generating the variable payment authorization score, including a set of values, at least in part using the determined probability of the payment being received, the variable payment authorization score indicating the determined probability of the payment being received and including information associated with a probability of whether the particular merchant will, after payment, incur a positive net revenue for delivery of at least one of goods and services associated with a corresponding transaction;
   computer code for presenting to the application program interface a plurality of thresholds;
   computer code for receiving, at the application program interface from a subsystem of the merchant, a subset of the plurality of thresholds via a flag set for each of the thresholds in the subset of the plurality of thresholds, a value of each of the thresholds in the subset of the plurality of thresholds based on a type of an associated at least one of goods and services and for the associated at least one of goods and services being indicative of a probability of whether the merchant will, after payment, incur a positive net revenue for delivery of the associated at least one of goods and services, wherein the value is higher for digital content for which royalties are due than for digital content for which royalties are not due;
   computer code for determining by the application program interface whether the variable payment authorization score is acceptable based on one of the thresholds in the subset of the plurality of thresholds; and
   computer code for sending to the subsystem of the merchant a result of the determination in a form of a binary value.

14. A system, comprising:
   at least one processor;
   an application program interface executed by the at least one processor for:
   receiving a payment authorization request from a merchant;
   in response to the payment authorization request, generating a variable payment authorization score via the application program interface that interfaces with a billing system of the merchant, the generating including:
      determining, utilizing at least one of a plurality of heuristics, a probability of a payment being received based on information collected from a plurality of sources including a level of purchasing activity of a consumer and a previous purchasing or refund history of the consumer with respect to the merchant; and
   generating the variable payment authorization score, including a set of values, at least in part using the determined probability of the payment being received, the variable payment authorization score indicating the determined probability of the payment being received and including information associated with a probability of whether the particular merchant will, after payment, incur a positive net revenue for delivery of at least one of goods and services associated with a corresponding transaction;
   presenting to the application program interface a plurality of thresholds;
   receiving, at the application program interface from a subsystem of the merchant, a subset of the plurality of thresholds via a flag set for each of the thresholds in the subset of the plurality of thresholds, a value of each of the thresholds in the subset of the plurality of thresholds based on a type of an associated at least one of goods and services and for the associated at least one of goods and services being indicative of a probability of whether the merchant will, after payment, incur a positive net revenue for delivery of the associated at least one of goods and services, wherein the value is higher for digital content for which royalties are due than for digital content for which royalties are not due;
   determining by the application program interface whether the variable payment authorization score is acceptable based on one of the thresholds in the subset of the plurality of thresholds; and
   sending to the subsystem of the merchant a result of the determination in a form of a binary value.

* * * * *